United States Patent [19]

Koch et al.

[11] Patent Number: 4,784,368
[45] Date of Patent: Nov. 15, 1988

[54] SELF-CLOSING VALVE FOR SANITARY INSTALLATIONS

[75] Inventors: Wilhelm Koch, Bongard; Bernhard Burkard, Bremm Rheinland Pfalz, both of Fed. Rep. of Germany

[73] Assignee: American Standard Inc., New York, N.Y.

[21] Appl. No.: 104,132

[22] Filed: Oct. 5, 1987

[30] Foreign Application Priority Data

Oct. 13, 1986 [DE] Fed. Rep. of Germany ....... 3634827

[51] Int. Cl.[4] ............................................. F16K 47/04
[52] U.S. Cl. ....................................... 251/51; 251/52; 251/285
[58] Field of Search ...................... 251/48, 15, 36, 42, 251/51, 54, 55, 285; 222/477, 639

[56] References Cited

U.S. PATENT DOCUMENTS

| 213,324 | 3/1879 | Demarest | 251/51 |
|---|---|---|---|
| 1,132,570 | 3/1915 | Fivey | 251/51 |
| 1,171,085 | 2/1916 | Beck | 251/54 |
| 1,327,000 | 1/1920 | Watrous | 251/51 |
| 1,498,226 | 6/1924 | Beck | 251/54 |
| 1,513,830 | 11/1924 | LaCasse | 251/55 |
| 1,531,514 | 3/1925 | Simmons | 251/51 |
| 1,995,792 | 3/1935 | Brown | 251/52 |
| 2,181,581 | 11/1939 | Fraser | 251/52 |
| 2,212,308 | 8/1940 | Steen | 251/52 |
| 2,710,736 | 6/1955 | Miller | 251/51 |
| 2,991,795 | 7/1961 | Fraser et al. | 251/52 |
| 3,065,948 | 11/1962 | Nolan | 251/52 |
| 3,102,711 | 9/1963 | Filliung | 251/54 |
| 4,570,899 | 2/1986 | Kingham | 251/52 |

FOREIGN PATENT DOCUMENTS

| 2908882 | 9/1980 | Fed. Rep. of Germany . | |
| 8018314 | 3/1981 | Fed. Rep. of Germany . | |
| 402641 | 9/1909 | France | 251/51 |
| 392151 | 5/1933 | United Kingdom | 251/51 |
| 431448 | 7/1935 | United Kingdom | 251/52 |
| 882394 | 11/1961 | United Kingdom | 251/51 |
| 1337256 | 11/1973 | United Kingdom | 251/52 |

Primary Examiner—George L. Walton
Attorney, Agent, or Firm—James J. Salerno, Jr.; Robert G. Crooks; John P. Sinnott

[57] ABSTRACT

A self-closing valve assembly for sanitary installations is disclosed. The valve assembly includes upper and lower valve housings which define a metering chamber that is normally filled with a metering fluid. A metering means, shiftably mounted in the lower valve housing, includes a first one-way valve means which displaces a predetermined volume of the metering fluid when said valve assembly is shifted to its opened position. A closure means, which includes a second one-way valve means, is operably coupled to the metering means to automatically shift said metering means from its opened to its normally closed position, by transferring the displaced volume of said metering fluid in the metering chamber through a second one-way valve means after a predetermined period of time has elapsed, to thereby close said valve assembly.

4 Claims, 8 Drawing Sheets

SELF-CLOSING VALVE FOR SANITARY INSTALLATIONS

BACKGROUND OF THE DISCLOSURE

1. Field of the Invention

The invention relates to a self-closing valve for sanitary installations and, more particularly, to an improved valve assembly which will automatically close after a predetermined time has elapsed.

2. Description of the Prior Art

Self-closing valves of the type having a reciprocating handle with which the valve is opened and when released, after partial discharge of the back pressure chamber, and with the assistance of the valve spring, the valve returns to its closed position.

One of the advantages of using self-closing valves is that the quantity of water released upon actuation can be proportioned by a one-time adjustment when the assembly is installed so that water conservation is optimized. Self-closing valves are used primarily in public installations, such as baths, toilets and like sanitary facilities in institutional buildings, railroad stations, airports and the like. It is in the interest of water economy and conservation of water use to provide a self-closing valve to pre-select the quantity of water to be discharged. Other types of fittings with self-closing action are universally known, such as pushbutton or lever-actuated fittings for flushing toilets or urinals.

German Utility Design No. 8,018,314 discloses a self-closing valve for a water fixture. The valve includes a cup cylinder that seals a back pressure or metering chamber and caps the piston. When the valve is opened, a handle travels a preset stroke distance to discharge water from the metering chamber; then the metering chamber automatically fills when the handle returns to its closed position. The handle is of the rotary type and, when rotated, alters the setting of the cup cylinder axially relative to the plunger.

A disadvantage of this type of valve is that the main valve seal must be forced upon the valve seat against the inlet pressure of the water, which requires a high actuating force, to shift the handle to and from its closed to its opened positions. Another disadvantage is that needle protrudes into its passageway in the plunger and determines the least port area for filling the metering chamber. Such an arrangement is easily clogged by dirt particles.

SUMMARY OF THE INVENTION

An object of the present invention is to provide a self-closing valve having an accurate metering assembly to discharge water from its opened to its closed positions; which is simple and economical to manufacture; which includes means to readily vary the metering time; and which is interchangeable with conventional standardized half inch fittings.

The invention generally relates to a self-closing valve assembly for sanitary installations. Upper and lower valve housings are coupled in a watertight seal to define between them, a metering chamber. The metering chamber is normally filled with metering fluid. Metering means is shiftably mounted in the lower valve housing; at least one portion thereof is slideably disposed in fluid tight relation with the metering chamber. A one-way valve means, operably coupled to said metering means, is provided on the one end portion of the metering means which displaces a predetermined volume of the metering fluid in the metering chamber. An actuating assembly is mounted to the upper valve housing and includes means to shift the metering means from its normally closed, inoperative position to its open, operative position. Time adjusting means is operably coupled to the shifting means to preset the distance the metering means is shifted so that a predetermined volume of the metering fluid is displaced in the metering chamber. The one-way valve means is operably coupled to the closure means to automatically return the metering means from its opened to its closed position by transferring the displaced volume of metering fluid in the metering chamber after a predetermined period of time has elapsed, to thereby automatically close the valve assembly.

DETAILED DESCRIPTION OF THE PREFERRED EMBODIMENT

Figures 1A, 1C:
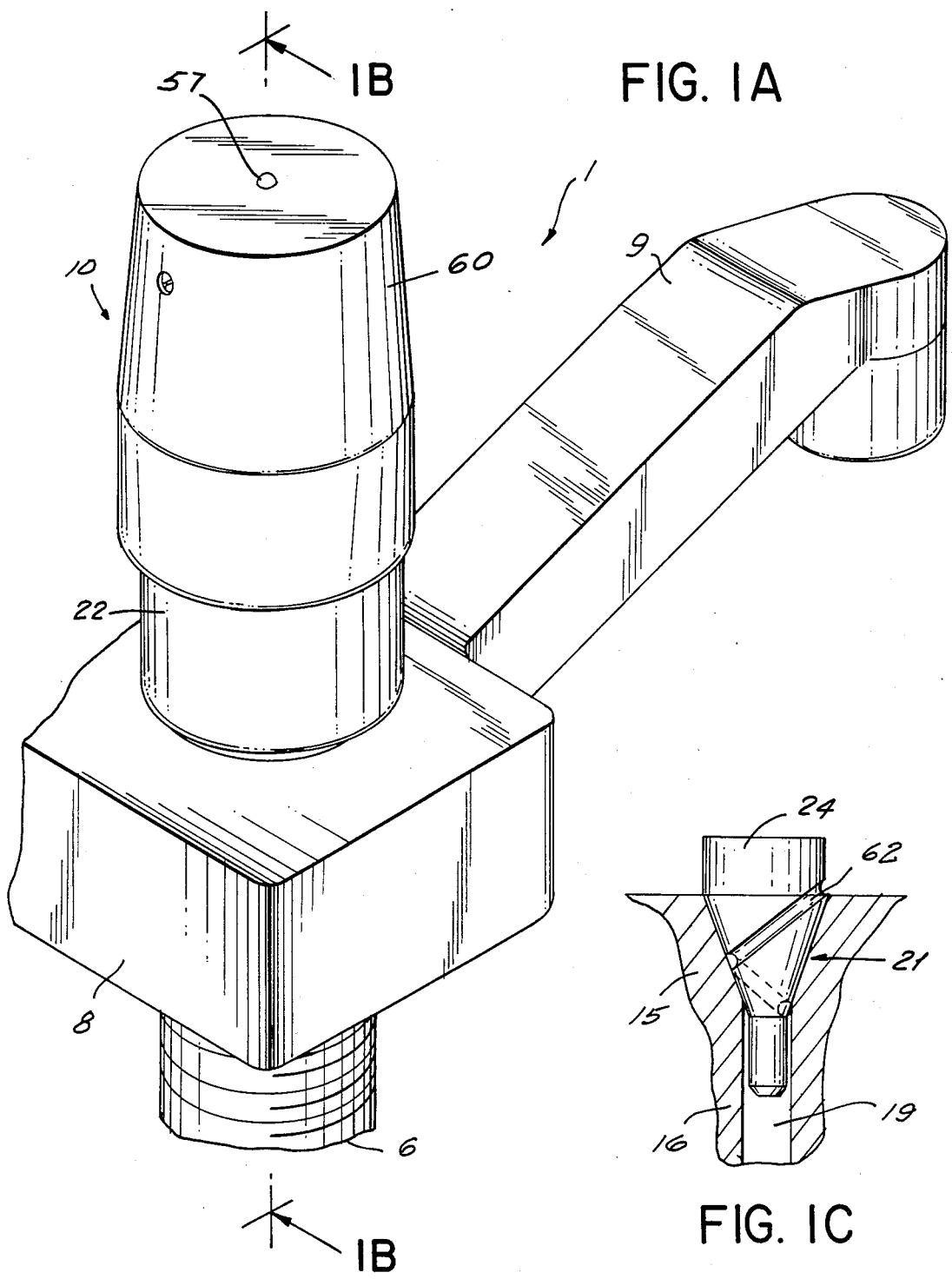
FIG. 1A is an isometric view of the self-closing valve assembly illustrating the present invention.
FIG. 1C is an enlarged fragmentary sectional view, in elevation, of the valve cone shown in FIG. 1B.
Figure 1B:
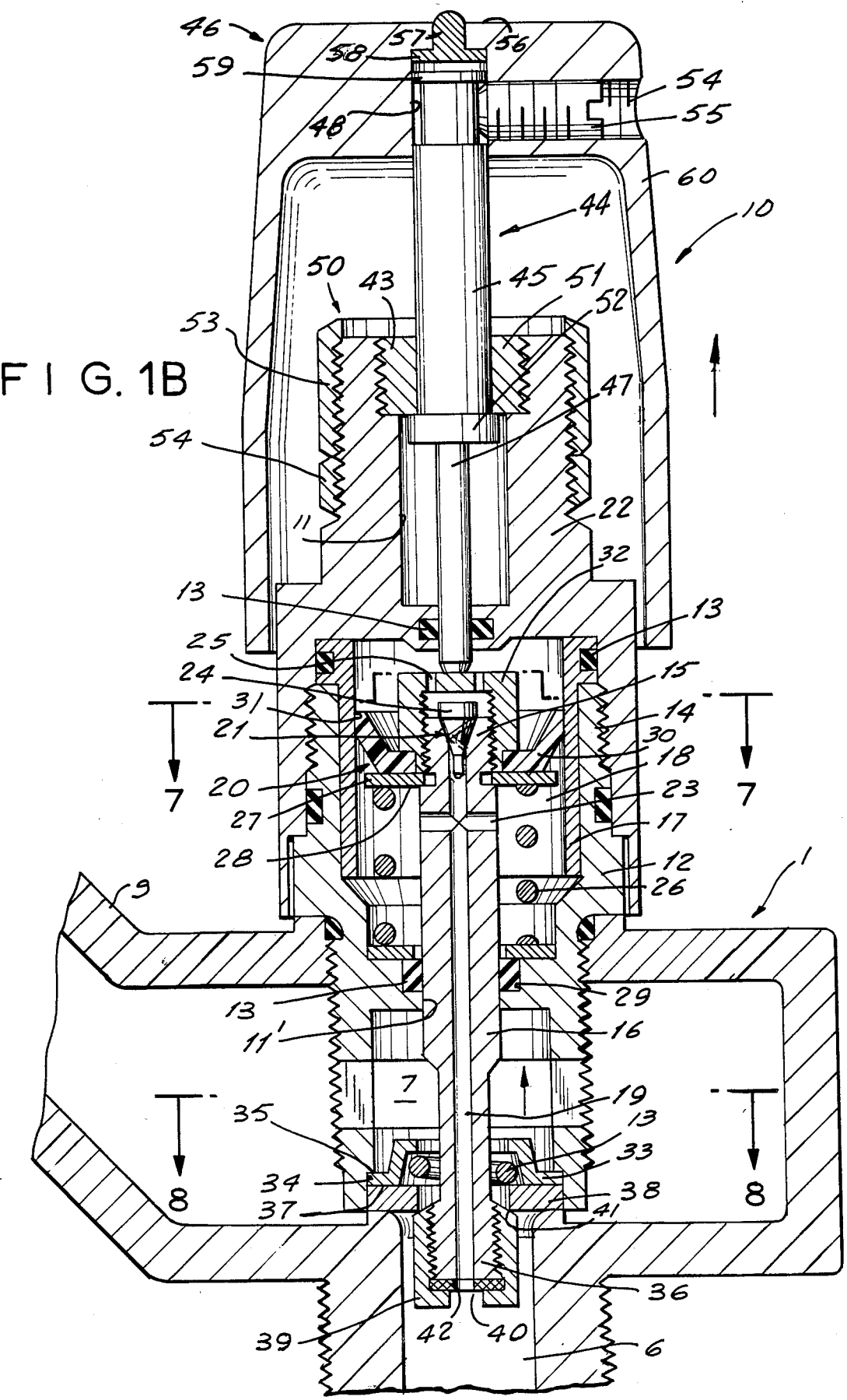
FIGS. 1B, 2 and 3 are sectional views, in side elevation, of the valve assembly in its closed, full opened and closing positions respectively, taken along the line 1B—1B of FIG. 1A.

In the drawings, particularly FIG. 1, self-closing valve assembly 10 is mounted in a valve body 8 of a faucet 1 for sanitary installations. Faucet 1 includes a water inlet 6 and a spout 9, all of which are in fluid communication with the water outlet opening 7 of valve 10, as illustrated in FIG. 1B. Upper and lower housing 12,22 of valve assembly 10 are threadedly coupled together by complimentary threads 14 to define between them, a back pressure or metering chamber 18. A plastic cylindrical sleeve 17 is inserted into lower housing 12 and nests against the vertical walls of metering chamber 18. An O-ring 13 is mounted to the upper end of sleeve 17 to provide a watertight seal between upper and lower housings 12,22. An axial passageway 11,11' is provided in the upper and lower housings 12,22. A valve pin 16 is reciprocally mounted in axial passageway 11' of lower housing 22. One-way valve means 20, disposed in metering chamber 18, is threadedly coupled to upper end 15 of valve pin 16. An axial passageway 19 and transverse passageway 23, formed in valve pin 16, communicate with metering chamber 18 and form a part of one-way valve means 20. Axial passageway 19, at its upper end 21, is conically shaped so that valve cone 24 nests therein. Transverse passageway 23 interconnects axial passageway 19 near the upper end of valve pin 16 so that transverse passageway 23 lies within metering chamber 18. A valve spring 26, disposed in lower housing 12, is positioned around valve pin 16, with its lower end biased in the base portion of lower housing 12 and its upper end biased against one-way valve means 20. One-way valve means 20 includes a metal disc 27 which nests against a shoulder 28 of valve pin 16. One-way valve means 20 includes cup seal 30, made of rubber-like material, and is positioned against metal disc 28 with the outer periphery 31 of cup seal 30 pressed against the inner walls of plastic sleeve 17 in a sliding fit so that when cup seal 30 shifts downwardly, FIG. 2, metering fluid passes around its periphery but does not bypass cup seal 30 when cup seal 30 shifts upwardly, FIG. 3. Screw cap 32, formed with one or more ports 25, is internally threaded and is mounted on threaded upper end 15 of valve pin 16. Valve cone 24 and cup seal 30, which form a part of one-way valve means 20, are held in place by screw cap 32 which is threaded on upper end 15 of valve pin 16. Ports 25 of screw cap 32 are preferably formed with four ports to permit metering fluid to pass therethrough when valve assembly is shifting from its opened to its closed position, FIG. 3. Also, screw cap 32 biases valve spring 26 at its upper end so that valve pin 16 reciprocates in axial passageway 19. Lower end 36 of valve pin 16 is threaded and extends beyond lower housing 12. A cup-shaped disc 33 is mounted over lower end 36 with its periphery 34 nesting against a recess formed in lower housing 12. O-ring 13 forms a sliding fit against lower end 36 and is positioned in cup-shaped disc 33. A flat rubber or rubber-like washer 38 is seated against outer flanged surface of cup-shaped disc 33 and is housed in recess 35. A threaded cap nut 39, having a center opening 40, is fitted with a screen 42 to prevent particles entrained in the water from entering axial passage 19. Cap nut 39 is threaded onto lower end 36 of valve pin 16. The open end of cap nut 39 is formed having a beveled surface 41 and seats against flat rubber washer 38 when valve pin 16 is in its closed position, and shuts off water flow through valve assembly 10. An O-ring 13 is seated in a recess 29 of lower housing 12 and forms a watertight seal between valve pin 16 and metering chamber 18.

Figure 2:
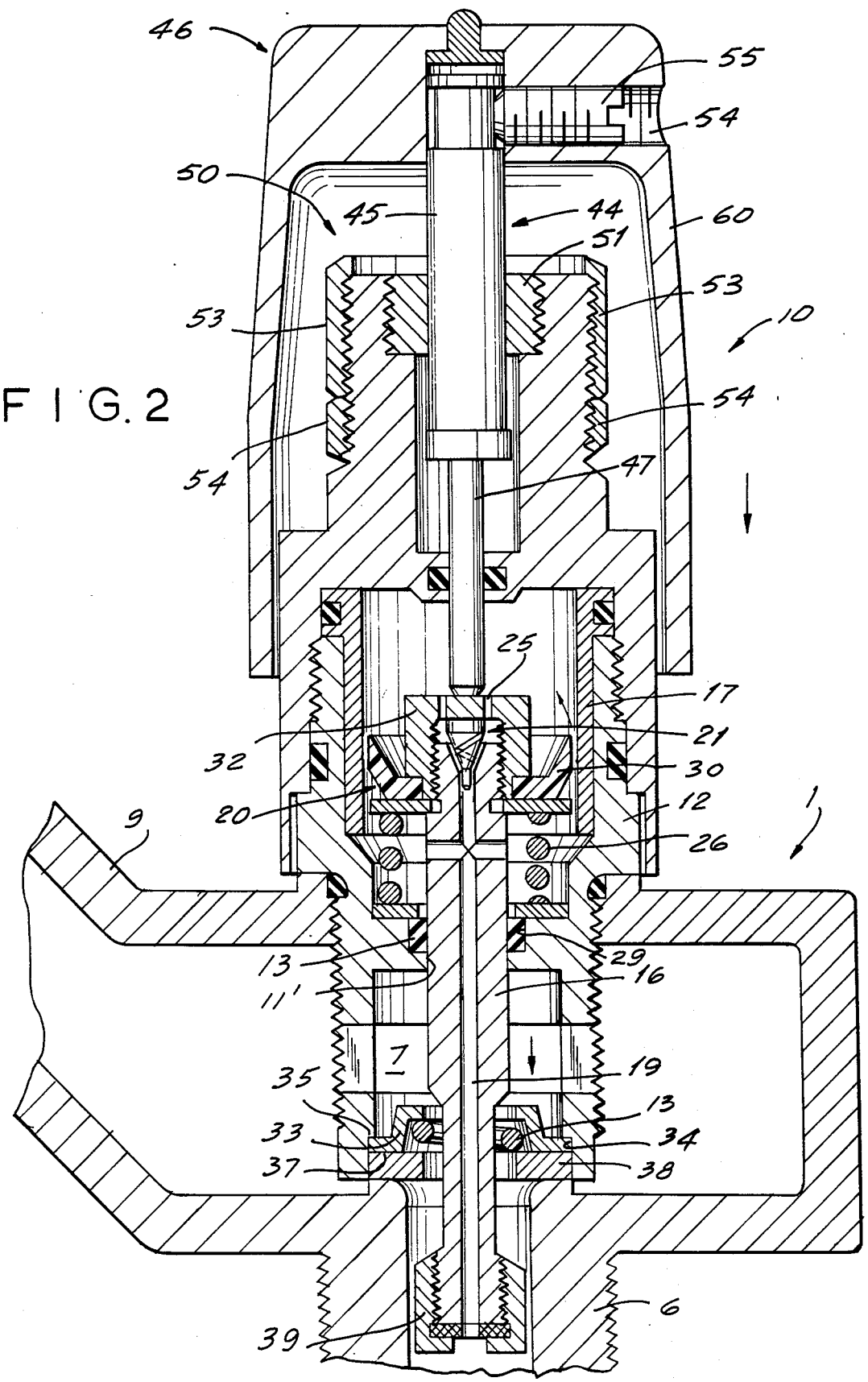
Figure 3:
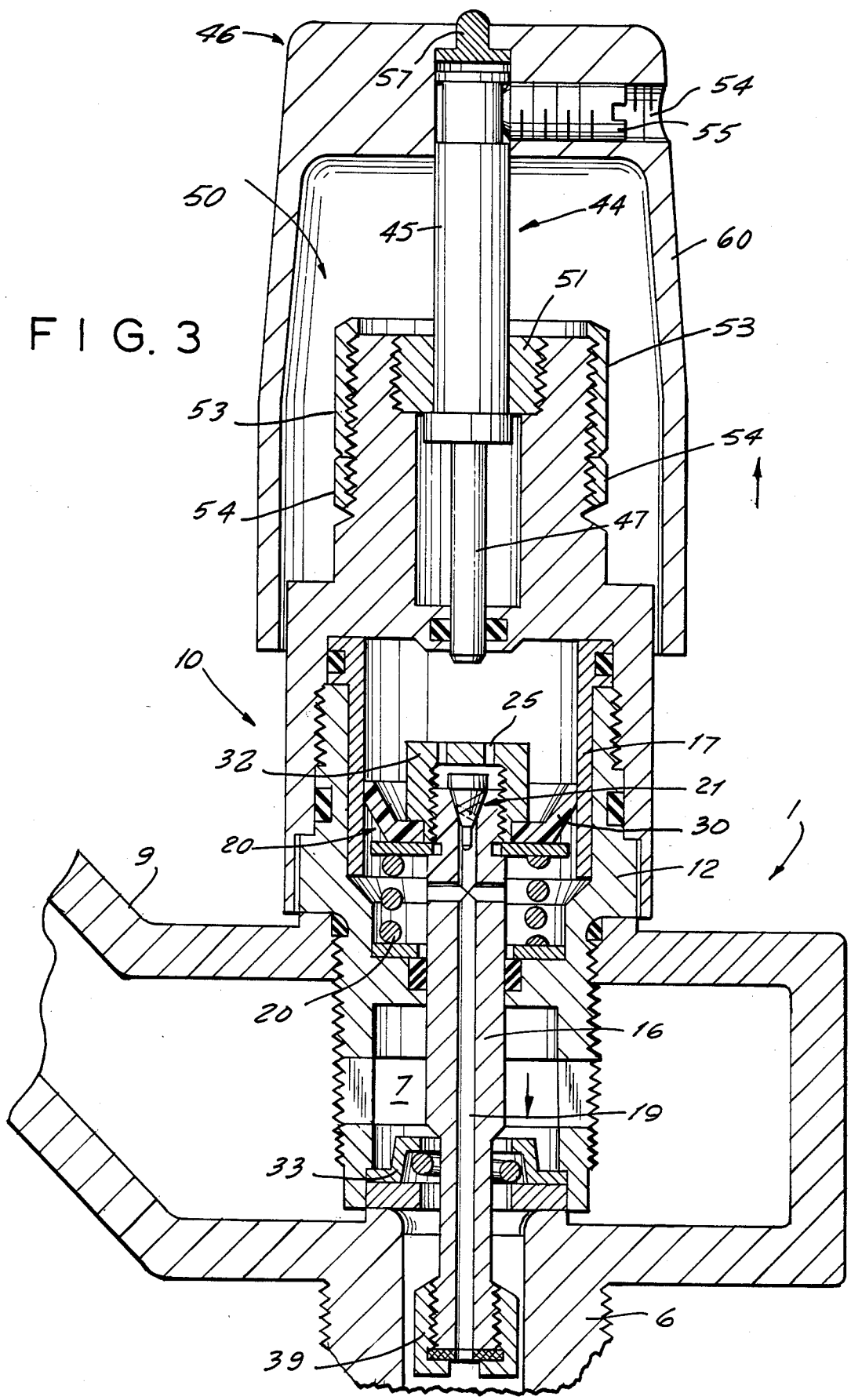
Figure 4:
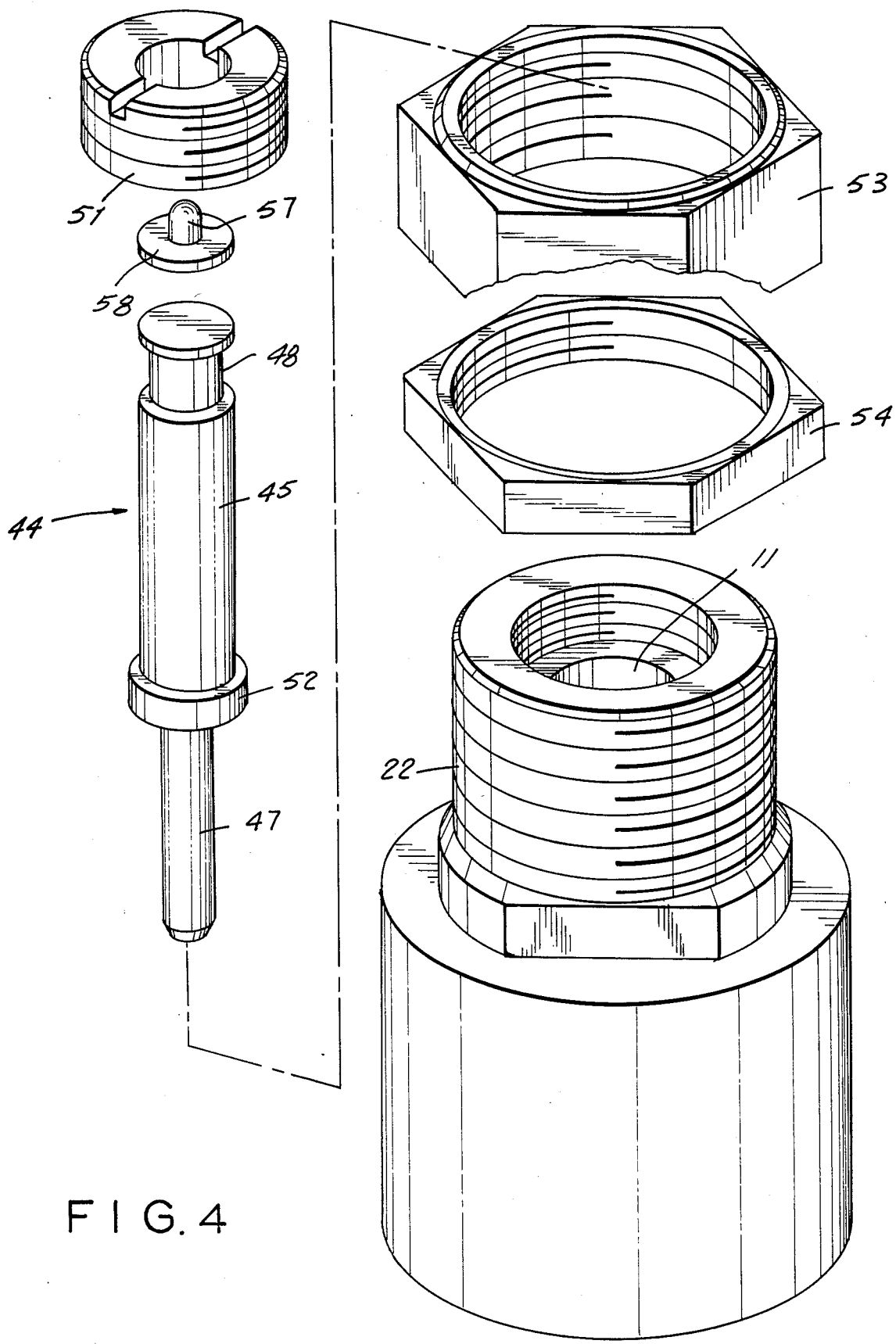
FIGS. 4, 5 and 6 are exploded isometric views of the valve assembly of FIGS. 1B through 3, shown without the handle assembly mounted thereon.
Figure 5:
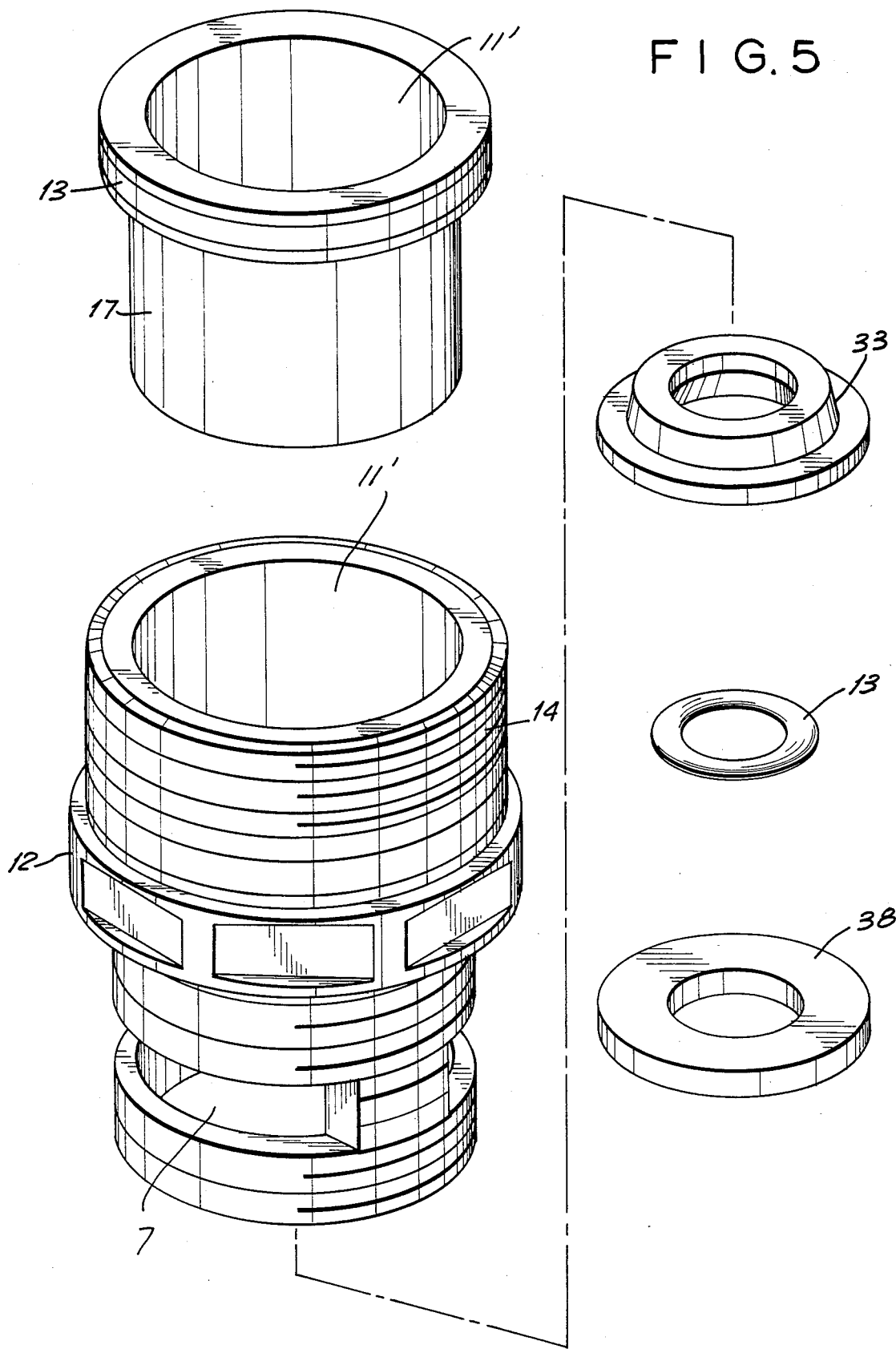
Figure 6:
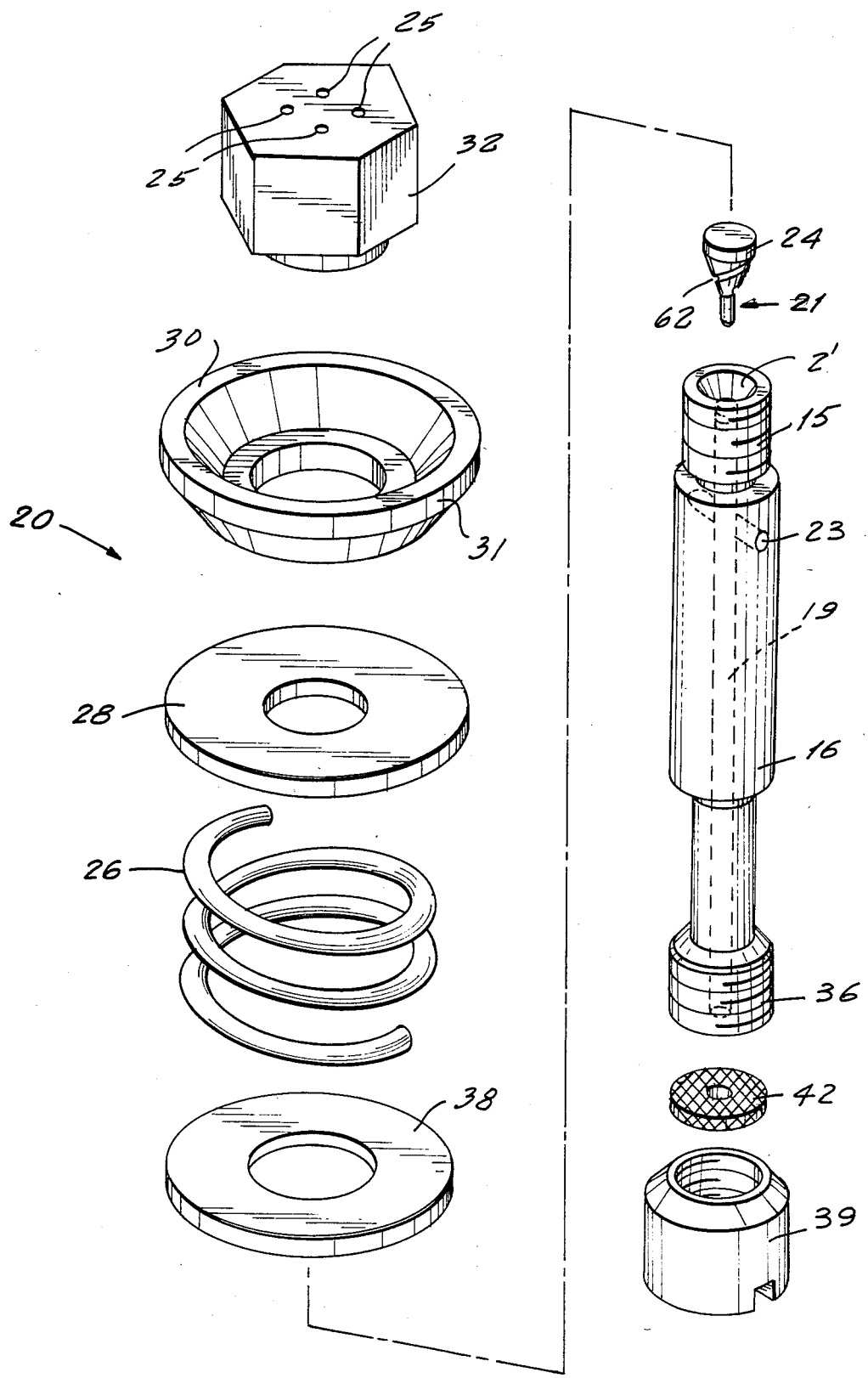
Figure 7:
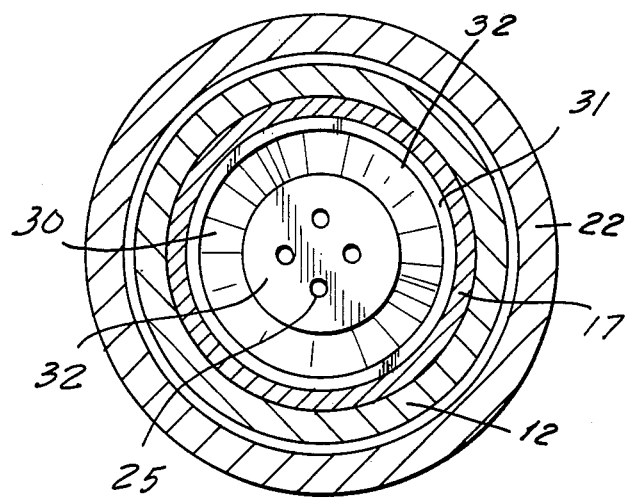
FIG. 7 is a sectional view taken along the line 7—7 of FIG. 1B.
Figure 8:
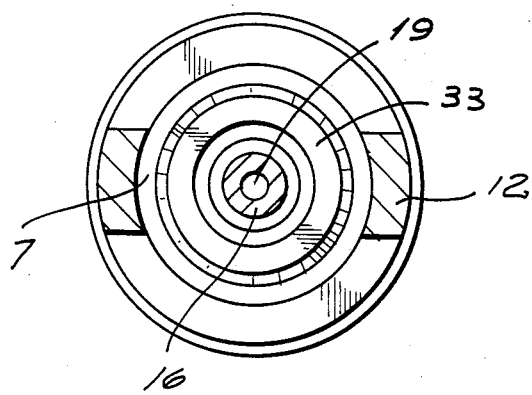
FIG. 8 is a sectional view taken along the line 8—8 of FIG. 1B.

FIGS. 1B, 2 and 3 illustrate actuating assembly 46 mounted to upper housing 22 of valve assembly 10. Actuating assembly 46 includes timing assembly 50, handle 60 and a reciprocally mounted release pin 44 which is mounted in axial passage 11 of upper housing 22. Release pin 44 has an enlarged cylindrical section 45, the upper end of which is disposed in recess 59 of handle 60. An index plate 58, having a central formed rod 57, perferably made of a colored plastic to indicate hot and cold water, is mounted in recess 59 of handle 60, as illustrated for example in FIGS. 1A-13 3. A set screw 55 is threaded into horizontal threaded opening 54 of handle 60 and seats in an annular slot 48 formed in cylindrical section 45 of release pin 44 to fix handle 60 in place. Lower cylindrical section 47 of release pin 44 extends into metering chamber 18. O-ring 13, seated in recess in the lower end of upper housing 22, surrounds axial passageway 11 and forms a sliding watertight seal with lower cylindrical section 47 of release pin 44 and axial passageway 11. An externally threaded nut 51, having a diameter such that upper cylindrical section is slidable therein. Nut 51 is threaded into a complimentary threaded recess 43 in upper housing 22. A shoulder 52, dividing upper and lower sections 45,47 of release pin 44, forms a stop which prevents actuating assembly 46 from being removed from upper housing 22.

Timing assembly 50 includes internally threaded adjusting nut 53 and lock nut 54 which are mounted on complimentary threads of upper housing 22. By raising and/or lowering adjusting nut 53, the stroke distance of release pin 44 is determined. Lock nut 54 is biased against adjusting nut 53 to fix the stroke distance of release pin 44, i.e., the distance that valve pin 16 is shifted in its opened position. This then sets the time valve pin 16 of valve assembly is opened.

Cone valve 24, as shown in FIG. 1C, is formed having at least one spiral groove 62 along its conical surface. The cross-sectional area of spiral groove 62 is such that the maximum volume of displaced metering fluid, show in FIG. 2, passes through spiral groove 62 of valve means 20 in a predetermined period of time to return one-way valve means 20 from its opened, FIG. 3, to its closed position, FIG. 1B. As shown in FIG. 2, the metering fluid below cup seal 30 is displaced to the upper portion of metering chamber above cup seal 30 as one-way valve means 20 is shifted downwardly by release pin 44 of actuating assembly 46. The downward force causes the metering fluid to pass by the outer periphery 34 of cup seal 30 while only a small amount, if any, of metering fluid passes through transverse passageway 23, through axial passageway 19 and up through spiral groove 62 of valve cone 24. The displacement of metering fluid occurs because the pressure exerted against one-way valve means 20 is greater than the pressure of the metering fluid above cup 30, which causes metering fluid to pass around periphery 34 of cup seal 30, as valve pin 16 starts to return to its closed position, shown in FIB. 1B, metering fluid above the cup seal passes only through spiral groove 62 so that the displaced fluid above the cup seal is metered into the lower half of the metering chamber over a predetermined period of time, shown in FIB. 3. This occurs because the pressure below the cup seal is greater than the pressure above the cup seal, thereby forcing the liquid from above the cup seal through cone valve 24. By changing the cross-sectional area of spiral groove 62, either making the cross-sectional area greater or smaller will decrease or increase the time valve assembly 10 is open. Also, the volume of displaced metering fluid from above cup seal 30 to below cup seal 30 is varied by changing the stroke distance of release pin 44 so that the time required to transfer the displaced metering fluid is either increased or decreased. The flow rate of water discharged through spout 9 remains substantially constant since the opening through cup-shaped disc 33 and O-ring 13 of valve pin 16 remains substantially constant when shifting from its opened to its closed position.

Faucet 1 is mounted to a sanitary installation such as a lavatory, not shown. Valve assembly 10 functions in the following manner: in its closed position, valve spring 26 urges valve pin 16 upward until cap nut 39 seats against rubber washer 38. In this position, valve cone 24 is seated in the recess 21 of axial passageway 19, shown in FIG. 1B and illustrated more clearly in FIG. 1C. In this position, the pressure above and below cup seal 30 is the same. The line pressure of the water through inlet 6 of faucet 1 is the same below and above cup seal 30 because axial passageway 19 and transverse passageway 23 communicate with metering chamber 18 and the line water pressure. When valve assembly 10 is opened by pushing down on handle 60, the force exerted against valve pin 16 causes metering fluid in chamber 18 to be displaced from below the cup seal to above the cup seal, as described above. A force of 20-30 N is all that is required to shift valve assembly 10 from its closed to its opened position. As this occurs, cone valve 24 is pushed upward and is seated against screw cup 32 so that metering fluid passes around and through cone valve 24 through openings 25. Thus, both cup seal 30 and cone valve 24 act as a one-way valve to displace metering fluid from below cup seal 30 to above cup seal 30. When the downward force against handle 60 ceases and is released, handle 60 returns to its normal position, valve pin 16 is in its fully opened position, and valve spring 26 urges one-way valve means 20 upward in metering chamber 18 so that the displaced metering fluid traverses only through spiral groove 62 of cone valve 24, as shown in FIG. 3, until valve pin 16 reaches it fully closed position, shown in FIG. 1B. It should be noted that when valve pin 16 is pushed downwardly, cone valve 24 will rise due to the water line pressure exerted through axial passageway 19. While the valve is in its opened position, water flows through the outlet opening and out spout 9 where a constant pressure of water discharge is maintained due to the arrangement of cup-shaped disc 33 and O-ring 13 and the uniform flow of metering fluid downwardly through spiral groove 62. Any excess metering fluid which passes through axial passageway 19 will be discharged through spout 9.

It is claimed:

1. A self-closing valve assembly for sanitary installations comprising:

upper and lower valve housings coupled in a watertight seal to define between them, a metering chamber, normally filled with water as a metering fluid, the inner walls of which are lined with a plastic sleeve;

a metering means, shiftably mounted in said lower valve housing, including a first and second one-way valve means, said first one-way valve means is operably mounted in said metering chamber and displaces a predetermined volume of said metering fluid when said valve assembly is in its opened position;

said metering means includes a valve pin shiftably mounted in said lower housing, the upper end of which is disposed in said metering chamber, said upper end of said valve pin, having operably coupled thereto, said first and second one-way valve means, said valve pin having axial and transverse passageways formed therein, and which communicate with said metering chamber at said one end of said valve pin;

said first one-way valve means having a cup seal, positioned in said metering chamber, mounted to said upper end of said valve pin, said cup seal having a periphery made of resilient, deformable material to permit metering fluid to flow therearound when said first one-way valve means is shifted in said metering chamber from its closed to its opened position;

an actuating assembly comprising a handle and surrounding a portion of said upper valve housing, to shift said metering means from its normally closed, inoperative position to its open, operative position;

said actuating assembly including time adjusting means operably coupled to said upper housing portion within said handle to preset the distance said metering means is shifted so that a predetermined volume of said metering fluid is displaced in said metering chamber by said first one-way valve means;

closure means, including said second one-way valve means, operably coupled to said metering means to automatically shift said metering means from its opened to its normally closed position;

said second one-way valve means including a cone valve mounted to said lower housing and positioned in a corresponding conical valve seat formed in said axial passageway of said lower housing, said cone valve and said conical recess having a spiral passageway of constant cross sectional area which is in fluid communication with said metering chamber and said axial and transverse passageways whereby said displaced volume of said metering fluid is transferred at a constant rate said metering chamber after a predetermined period of time has elapsed when said first one-way valve means is shifted from its open to its close position in said metering chamber, to thereby automatically close said valve assembly.

2. The self-closing value assembly, in accordance with claim 1, wherein said actuating assembly includes adjusting means operably mounted to said upper housing to vary the stroke distance of said release pin, thereby varying the time said valve assembly is in its opened position.

3. The self-closing value assembly, in accordance with claim 2, wherein said lower housing is mounted to a sanitary fitting.

4. A self-closing valve assembly for sanitary installations comprising:

upper and lower valve housings coupled in a watertight seal to define between them, a metering chamber normally filled with water as its metering fluid, the inner walls of which are lined with a plastic sleeve;

a metering means, shiftably mounted in said lower valve housing, including first and second one-way valve means, said first one-way valve means is operably mounted in said metering chamber and displaces a predetermined volume of said metering fluid when said valve assembly is in its opened position;

an actuating assembly comprising a handle and surrounding a portion of said upper valve housing, to shift said metering means from its normally closed, inoperative position to its opened, operative position;

said actuating assembly including an axially mounted, shiftable release pin disposed in said upper housing, one end of which extends into said metering chamber to shift said metering means from its normally closed, inoperative position to its opened, operative position;

said release pin including an annular rim formed between the ends thereof to provide stop means to prevent said release pin from being removed from said upper housing;

time adjusting means operably coupled to said upper housing portion within said handle to preset the distance said metering means is shifted so that a predetermined volume of said metering fluid is displaced in said metering chamber by said first one-way valve means; and closure means, including said second one-way valve means, operably coupled to said metering means to automatically shift said metering means from its opened to its normally closed position by transferring, at a substantially uniform rate, said displaced volume of said metering fluid through said second one-way valve means to said metering chamber after a predetermined period of time has elapsed when said first one-way valve means is shifted from its open to its close position in said metering chamber.

* * * * *